United States Patent [19]

Anderson et al.

[11] Patent Number: 4,868,477

[45] Date of Patent: Sep. 19, 1989

[54] METHOD AND APPARATUS FOR CONTROLLING TORQUE AND TORQUE RIPPLE IN A VARIABLE RELUCTANCE MOTOR

[75] Inventors: Frank J. Anderson, Northford; Peter Senak, Jr., Bristol, both of Conn.

[73] Assignee: The Superior Electric Company, Bristol, Conn.

[21] Appl. No.: 65,399

[22] Filed: Jun. 23, 1987

[51] Int. Cl.⁴ .............................................. H02P 8/00
[52] U.S. Cl. .................................... 318/696; 318/685
[58] Field of Search ....................... 318/696, 685, 138; 310/49 R

[56] References Cited

U.S. PATENT DOCUMENTS 4,661,756  4/1987  Murphy et al. ..................... 318/701
4,670,696  10/1987  Byrne et al. ......................... 318/701

*Primary Examiner*—William M. Shoop, Jr.
*Assistant Examiner*—Saul M. Bergmann
*Attorney, Agent, or Firm*—McCormick, Paulding & Huber

[57] ABSTRACT

Apparatus for controlling torque and torque ripple in a variable reluctance motor uses a generated torque waveform for each phase of the number of phases associated with the motor and corresponds to an electrical current having a predetermined constant magnitude. The generated torque waveforms are utilized to provide a table of values representative of the electrical current magnitude at each of a number of sensed rotor angular positions. The values correspond to the torque produced by the motor when excited by an electric current having that value and the location of the value in a memory device are defined by the sensed angular position of the rotor and a desired torque command signal. Depending on the torque to be produced by the motor and the rotor position, the motor is excited with the value of current selected for one or a combination of phases to cause the motor to develop a desired torque which has a substantially flat and ripple-free response characteristic.

6 Claims, 4 Drawing Sheets

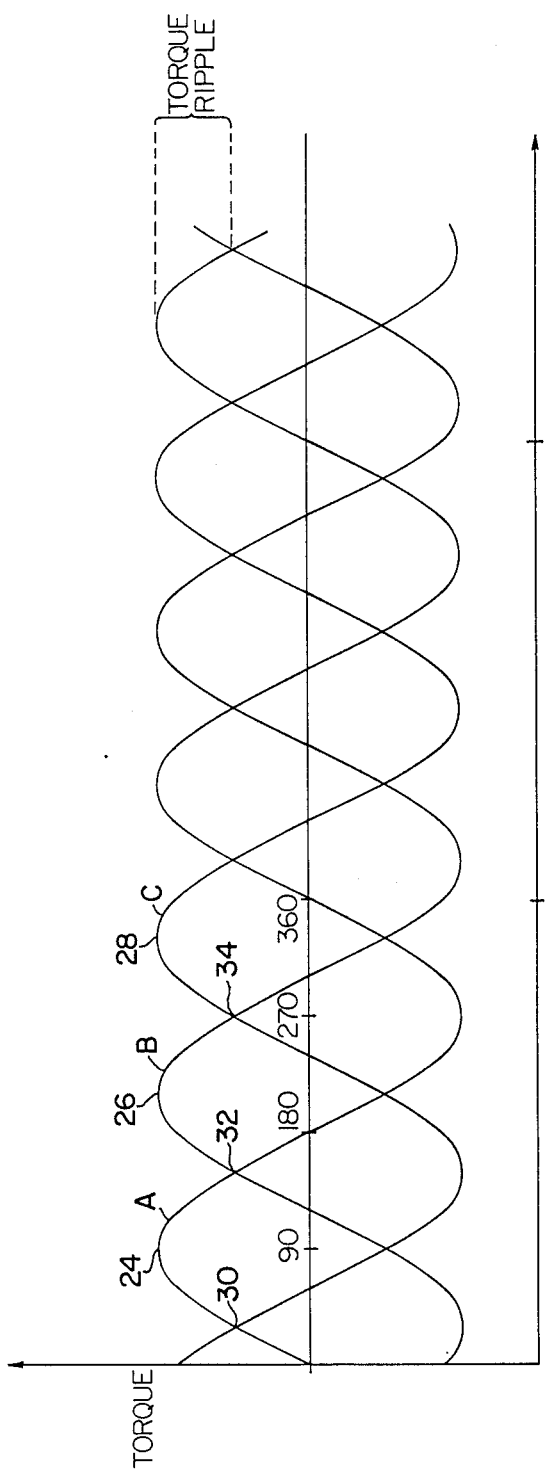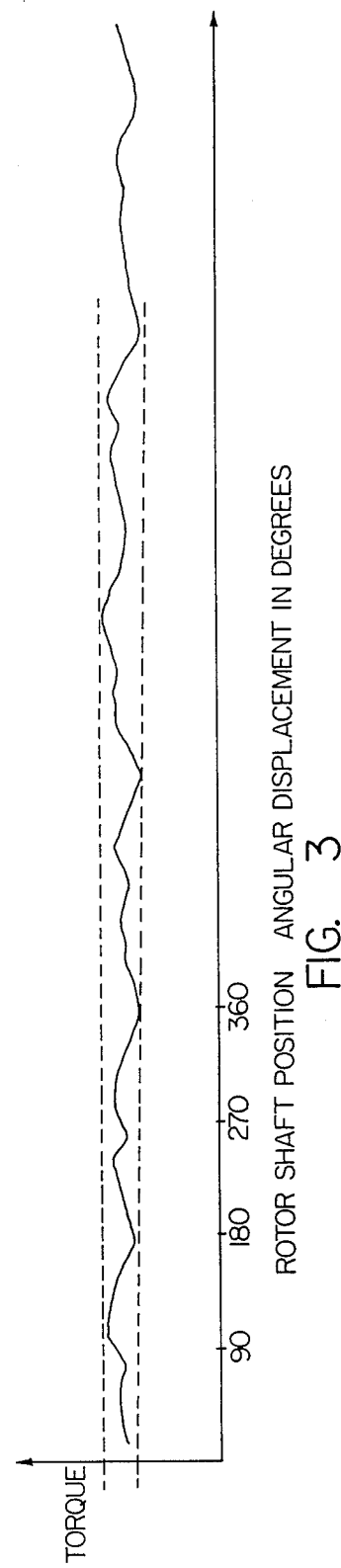

METHOD AND APPARATUS FOR CONTROLLING TORQUE AND TORQUE RIPPLE IN A VARIABLE RELUCTANCE MOTOR

BACKGROUND OF THE INVENTION

The present invention relates to torque control of variable reluctance motors and deals more specifically with a method and related commutation apparatus for controlling torque and smoothing torque ripple produced by a variable reluctance motor.

It is generally desirable to use variable reluctance motors in positioning systems because they can be used as direct drive motors to produce rotation in small, discrete steps. In addition, variable reluctance motors are generally low cost, small in size and have a high torque-to-inertia ratio. In spite of their desirability for use as servomotors, variable reluctance motors are limited in their application due to torque ripple and nonlinear torque-to-input current ratio. Torque ripple is generally defined as the variation in the maximum available output torque as the position of the rotor varies with respect to the stator.

Known techniques for controlling torque and reducing torque ripple have not proved to be totally satisfactory. One approach attempts to produce constant torque by modulating the current supplied to the motor wherein the current is limited during the high torque portion of the cycle. This approach has the disadvantage of limiting the maximum torque developed by the motor to a level which can be substantially below the peak torque.

Another known technique is to energize more than one phase in a multiphase motor during those portions in the rotor's rotation where the torque developed by the individual phases is near its minimum. This approach reduces the torque to about 80% of peak torque and generally requires a more complex commutation control circuit than otherwise used to control the energization of the stator voltagne phases.

It is an object of the present invention therefore to provide a method and related commutation apparatus for controlling a variable reluctance motor to produce a constant desired torque without torque ripple.

SUMMARY OF THE INVENTION

In accordance with the present invention, apparatus for controlling torque and torque ripple in a variable reluctance motor including a stator and a rotor arranged for movement about a common axis and relative to one another is presented. A torque waveform is generated for each phase of the number of phases associated with the motor and corresponds to an electrical current having a predetermined constant magnitude. The torque waveform is utilized to provide a table of values representative of the magnitude of electric current at each of a number of sensed angular positions of the rotor relative to the stator and corresponds to a torque developed by the motor when the motor is excited by an electrical current having that value. The value of the electrical current contained within the table is defined by the sensed angular position of the rotor and a torque command signal representative of a desired torque to be developed by the motor. The value of the electrical current is supplied to a current amplifier which generates an electrical current having a magnitude equal to the defined value and supplies this current to the motor to cause the motor to develop the desired torque which has a substantially flat and ripple-free response characteristic.

BRIEF DESCRIPTION OF THE DRAWINGS

Other objects, features and advantages of the present invention will become readily apparent from the following written description and drawings wherein:

FIG. 2 is a graph illustrating the torque versus rotor position function for a variable reluctance motor.

FIG. 3 is a graph of an actual torque versus rotor position function for a variable reluctance motor operating with conventional control techniques.

DETAILED DESCRIPTION OF THE PREFERRED EMBODIMENTS

Figure 1:
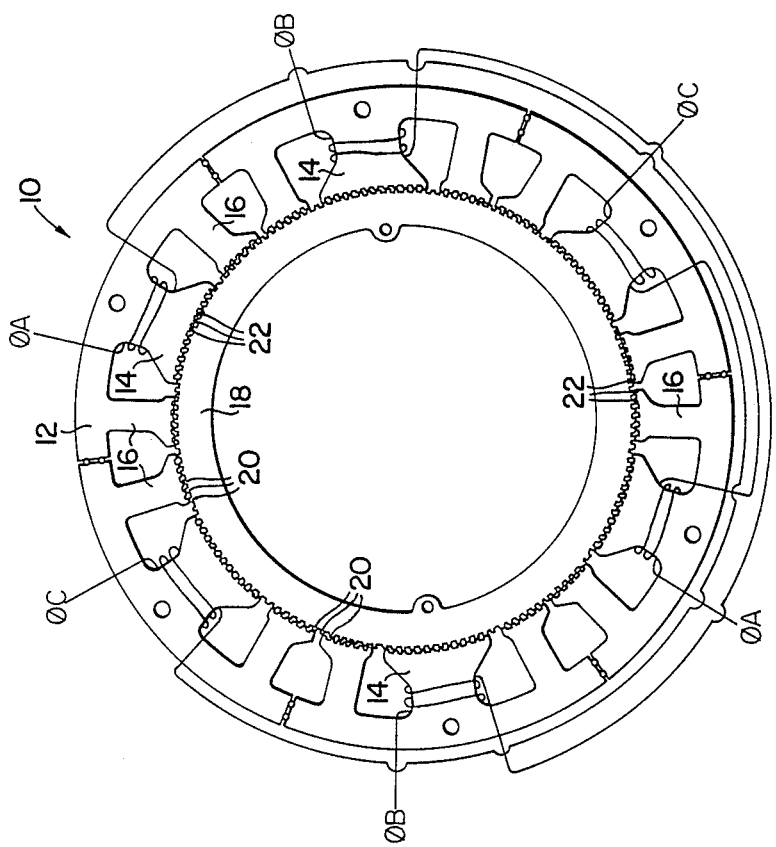
FIG. 1 is a somewhat schematic, cross sectional view of a variable reluctance motor.

Turning now to the drawings and specifically considering FIG. 1, a variable reluctance motor with which the torque controller of the present invention may be used is shown for illustrative purposes and is designated generally 10. Although the present invention may be practiced with any variable reluctance motor, reference may be had to a copending application Ser. No. 043,092, filed Apr. 27, 1987 entitled VARIABLE RELUCTANCE MOTOR and assigned to the same assignee as the present invention for details of construction and operation. The operation of a variable reluctance motor is generally well understood and its operation is briefly explained in the following to facilitate the understanding of the present invention.

The variable reluctance motor 10, illustrated in FIG. 1 includes a segmented annular stator assembly 12 having a number of salient inwardly projecting pole members some of which are winding poles 14,14 and others are non-winding poles 16,16. Each two of the non-winding poles 16,16 are associated with a winding pole member 14 and are located in a spaced apart relationship with and at opposite sides of the winding pole member. A rotor 18 is supported for rotation and is arranged coaxially with the stator 12 and has teeth 20,20 which coact with teeth 22,22 located on the faces of the stator pole members 14,16. Three phases corresponding to the phases of a three-phase voltage supply source are labeled A, B and C around the periphery of the stator 12 and the windings associated with each phase are wound about stator pole members 14,14 which are associated with each phase and are disposed opposite one another about the periphery of the stator. The rotor 18 is shown in FIG. 1 in the stable position it takes when phase C is energized, that is, with rotor teeth 20,20 aligned with each of the stator teeth 22,22 of the excited stator teeth of the pole members carrying the windings for phase C, thus providing a minimum reluctance path for the magnetic flux produced in the stator teeth. The rotor 18 can be moved one-third tooth clockwise from the position shown by turning phase C off and turning phase A on. With phase A energized, the magnetic field produces a torque on the rotor, causing the rotor to turn until its teeth are aligned with the stator teeth associated with the pole members carrying the windings for phase A. Likewise, the rotor 18 can be moved one third tooth counterclockwise by turning phase C off and turning phase B on. Continuous clockwise rotor motion can be produced by sequentially energizing the phases in the order C-A-B-C-A-B; and, counterclockwise rotor motion can be produced by sequentially energizing the phases in the order C-B-A-C-B-A.

Figure 4:
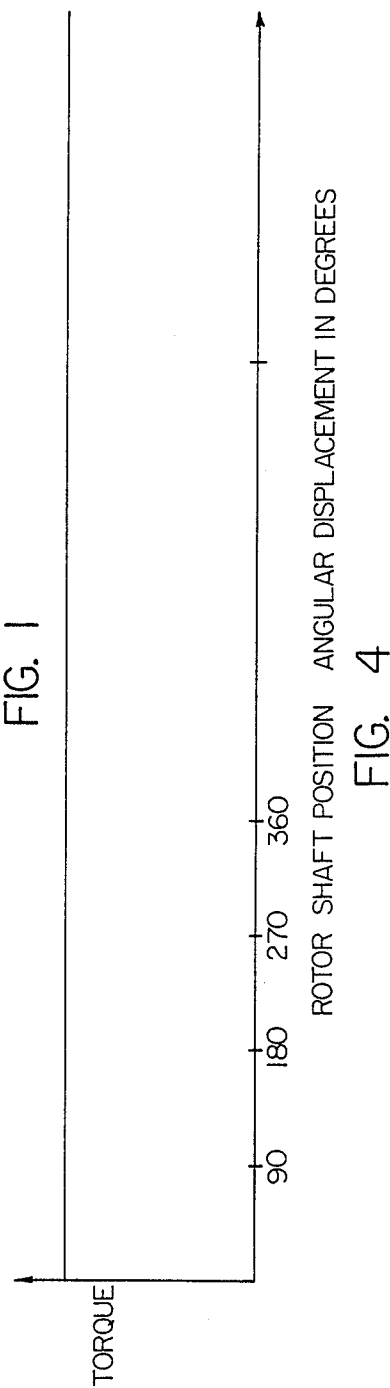
FIG. 4 is a graph illustrating the torque versus rotor position function for a variable reluctance motor operated with the torque control apparatus embodying the present invention.

Turning to FIGS. 2-4, FIG. 2 shows the torque versus rotor position characteristic waveform or curve generally obtained with a variable reluctance motor excited with conventional control apparatus. Each of the three phases A, B and C has a characteristic sinusoidally shaped curve representative of torque versus rotor position and the overlapping set of the three curves gives the torque relationship for the motor as a whole. The torque curve for each phase shows a high torque peak 24,26 and 28 separated by a low torque valley 30,32 and 34 respectively where the torque curves cross. The torque ripple is generally defined as the difference between the torque produced at the peak and the torque produced in the valley.

FIG. 3 shows a torque versus rotor position characteristic produced by a variable reluctance motor operated with a fixed level current supplied to each of the phases of the motor. It can be seen that the difference in available torque at the peak and valley is quite substantial and shows the available torque at the valley is approximately 80% of the peak torque.

In comparison, FIG. 4 shows a torque versus rotor position characteristic produced by a variable reluctance motor operated using the torque control apparatus embodying the present invention. The torque developed has a substantially flat and ripple free characteristic. The flat torque characteristic developed by the motor is achieved by selecting and controlling the magnitude of the current supplied to the stator windings in accordance with the available torque that can be produced by the motor at each of the rotor positions wherein a value of current is selected at each of the rotor positions to produce a given desired torque.

Figure 5:
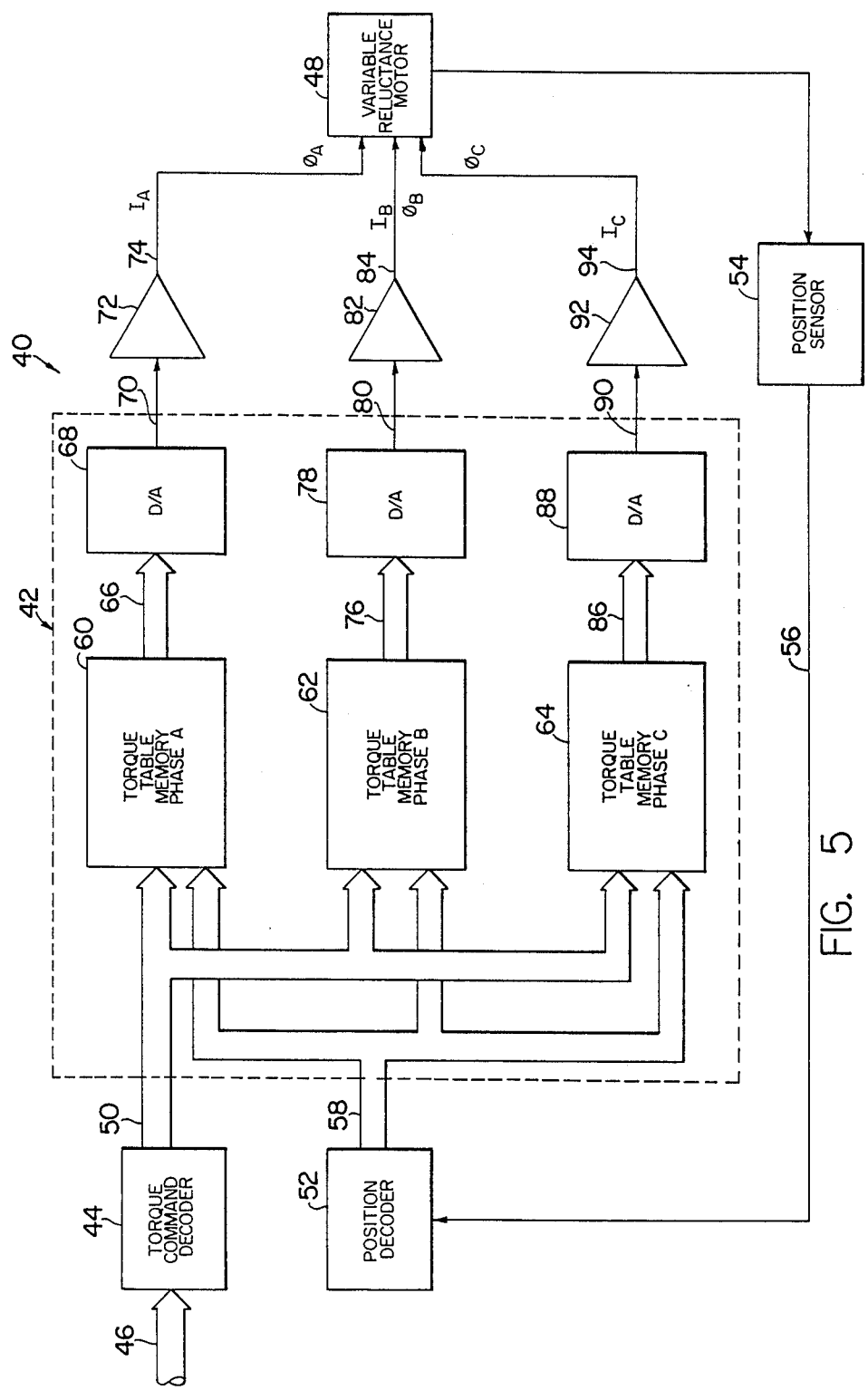
FIG. 5 is a functional block diagram of a direct drive servo positioning system including the torque control apparatus embodying the present invention.

Now considering the torque control apparatus of the present invention in greater detail and turning to FIG. 5, a functional block diagram of a direct drive servo positioning system is shown and generally designated 40. The positioning system 40 includes the torque control apparatus embodying the invention, generally within the dashed lines and designated 42 for controlling the torque and smoothing the torque ripple produced by a variable reluctance motor 48 used in the system. The system 40 includes a torque command decoder 44 coupled to an overall system controller (not shown) via a data bus 46. The data bus 46 carries electrical signals from the system controller and which signals are representative of a desired torque to be produced by the variable reluctance motor 48. The output of the torque command decoder is connected to a data bus 50 which carries a signal representative of the desired torque and which signal is in a digitally encoded format. The torque command signal carried on the bus 50 is connected to a number of input terminals of a memory device and which inputs are used to address storage locations in the memory device to access and retrieve information also in a digitally encoded format and stored in the addressed location.

A position decoder 52 receives information from a position sensor 54 by way of an electrical conductor 56. The position sensor 54 is connected to the variable reluctance motor 48 to sense the position of the rotor using generally well known measuring techniques and devices. The output of the position decoder 52 is connected to a data bus 58 which carries a signal representative of the position of the rotor and which signal is in a digitally encoded format.

The torque command signal carried on bus 50 and the position signal carried on bus 58 are coupled to input terminals of memory devices 60,62 and 64 and the torque and position signals taken together are used to address and access information stored at locations corresponding to a given torque value and rotor position. The storage locations of the memory devices can be considered to be arranged by rows and columns to form a matrix wherein a column is defined to contain torque values and a row is defined to contain rotor position values. A storage location defined by the intersection of given torque and rotor position values contains information representative of a predetermined value of current that is to be supplied to the corresponding phase of the motor to cause the motor to develop the desired torque. The information stored at each of the addressable locations is a digitally encoded word and is carried by a bus connected to the output of a respective memory device associated with each of the phases supplying current to the motor.

In the embodiment shown in FIG. 5, the torque table memory device 60 contains current values in a digital format for phase A and its output is connected to a bus 66 which carries a selected current value defined by the desired torque and rotor position to the input of a digital-to-analog converter 68. The digital-to-analog converter 68, as its name implies converts the digital signal at its input to an analog signal at its output 70, the analog signal having a magnitude representative of and proportional to the value of the digital word. The output 70 of the digital-to-analog converter 68 is connected to the input of a power current amplifier 72 which generates a supply current at its output 74 having a magnitude equal to the value selected from the addressed storage location in the memory 60. The current amplifier output 74 is connected to one phase of the variable reluctance motor, phase A in FIG. 5, to excite the stator windings associated with phase A of the motor.

Phases B and C are connected in a similar arrangement as phase A. Briefly, memory device 62 has its output connected to a bus 76 to couple the output of the memory device to digital-to-analog converter 78. The output 80 of the digital-to-analog converter 78 is fed to a power current amplifier 82 which provides a current at its output 84 having a magnitude equal to the value selected from the torque table memory 62. Similarly, the memory device 64 has its output connected to a bus 86 to carry a digitally encoded word from the memory to a digital-to-analog converter 88. The output 90 of the digital-to-analog converter 88 is coupled to a power current amplifier 92 which supplies at its output 94 a current having a magnitude equal to the value selected from the torque table memory 64. The digital-to-analog converters 68,78 and 88 are similar to one another and are generally well understood and known to those skilled in the art. The power current amplifiers 72,82 and 92 are likewise well known to those skilled in the art.

The memory devices 60, 62 and 64 are typically Programmable Read Only Memories (PROM) or Random Access Memories (RAM) devices and which devices are generally well known in the art and programmable in the normal manner. Other suitable memory devices may be used with the present invention. It will be appreciated that memory devices having larger storage capacities can provide a higher degree of resolution since the torque and rotor position magnitudes can be divided into finer increments and accordingly, a larger number of current values may be defined and accessed.

As stated above, the stator pole members are electrically excited to cause the rotor to rotate and develop a torque in an amount proportional to the magnitude of the current flowing in the stator windings until its teeth 20,20 reach a position of minimum magnetic reluctance relative to the teeth of the excited stator pole members. Upon energizing successive stator phases, the rotor turns a distance equal to the rotor pitch. The motor 10 illustrated in FIG. 1 has 144 stator teeth and 158 rotor teeth and typically produces 474 steps per revolution with a 0.76 degree change in rotor position upon each successive phase change.

Figure 6:
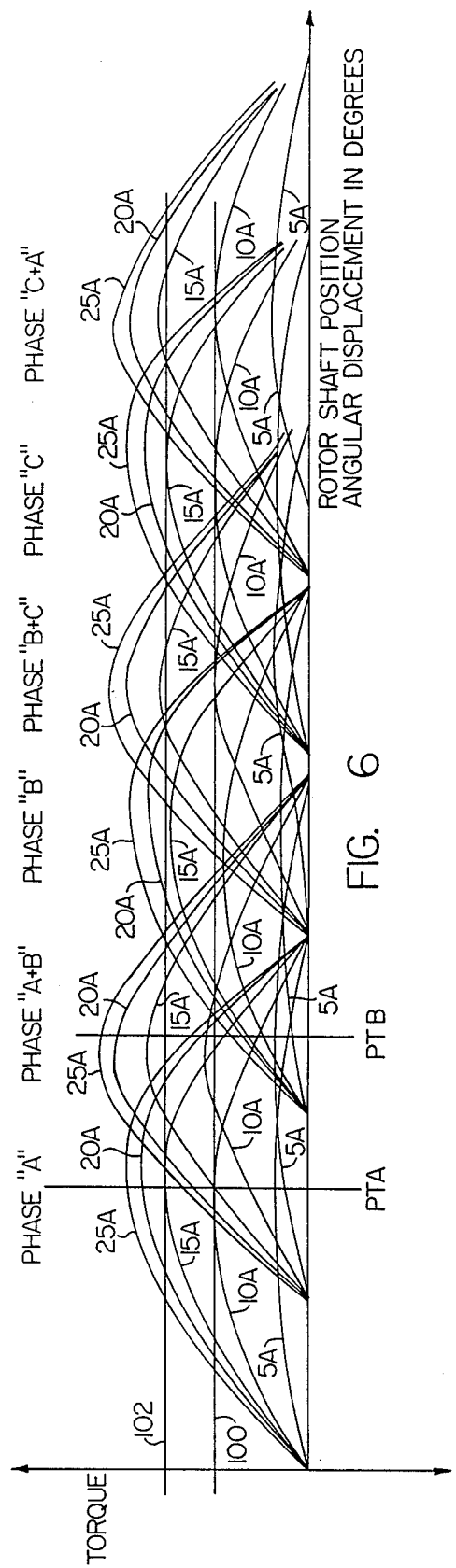
FIG. 6 is a graph of a family of torque versus rotor position waveforms for phases A, B, C, A+B, B+C and C+A for a given variable reluctance motor and which are used to map current values stored in a torque look-up table located in a memory device.

Turning now to FIG. 6, a graph showing a family of torque versus rotor position characteristic curves for a number of input current magnitudes is illustrated. Each of the curves has a sinusoidally shaped characteristic and although only the positive half of the torque-rotor position characteristic curve is illustrated, it will be understood that the curve also has a negative portion that is substantially identical to its positive half except that it is displaced in rotor shaft position to complete the electrical cycle. It will be understood that the values derived from the positive portion of the curves shown in FIG. 6 causes the motor to rotate in one direction and values derived from the negative half corresponding to the curves of FIG. 6 cause the motor to rotate in the opposite direction. It is also generally well understood to use commutation of the phases to produce acceleration and deceleration of the rotor.

The torque versus rotor position characteristic curves are illustrated for phases A, B and C and recalling FIG. 2, it is seen that the curves for the three phases are similar to the curves shown in FIG. 2. Consequently, in absence of the control apparatus embodying the present invention, a motor would exhibit a torque characteristic response having a torque ripple at the valleys formed by the intersection of the curves and in an amount equal to the difference between the peak torque and the torque at the valleys.

In accordance with the present invention, the decrease in available torque at a torque valley is compensated for by supplying power for the intersecting phases during the region of the torque curve characteristic including the valley. For example, the region of the torque curve characterized by the intersection of phases A and B between the intersection and the peaks of the curves is compensated by supplying power to both phases A and B. It will be seen from FIG. 6 that the torque characteristic curve due to phases A and B being excited simultaneously bridges the valley in the torque that would ordinarily be present. Accordingly, it is seen that a flat torque curve characteristic is obtainable by exciting at each of the rotor positions, one or more phases with an electrical current having a magnitude corresponding to the current required to produce the desired torque at the given rotor position. It will be appreciated that torque valleys will be present in those instances where the torque desired to be produced exceeds the torque producing capacity of the motor.

The torque versus rotor position characteristic curves shown in FIG. 6 are generated by supplying a current to each of the phases A, B and C and the combined phases A+B, B+C and C+A for each of a number of different current magnitudes. In the family of torque curves shown in FIG. 6, the torque values are generated for current values corresponding to 5, 10, 15, 20 and 25 amperes respectively. Also illustrated in FIG. 6 is a family of torque curves produced when phases A+B, B+C and C+A are excited at current magnitudes of 5, 10, 15, 20 and 25 amperes respectively.

In order to determine which phases are to be excited to produce a desired torque and to determine what values are to be stored in the memory device for each of the phases A, B and C, the commutation position of the rotor is examined to determine the available torque at the position and which phase or phases require excitation to produce the torque. For example, if the rotor is at a position corresponding to point A on the graph in FIG. 6, torque is available from the excitation of just phase A alone and also from the excitation of phases A and B. A decision is made as to whether phase A can supply sufficient current to produce the desired torque and if it can, then a value representative of the current at that torque value and rotor position is listed in the torque look-up table contained in the memory device associated with phase A. The corresponding storage locations in memories for phases B and C and which are identified by the torque value and rotor position have a value equal to zero.

If, for example, at position A, it is desired to produce a torque corresponding to a torque level represented by the line 100 it is seen that exciting phase A with a current equal to 10 amperes provides the desired torque. It is also seen at position A that exciting both phases A and B at a current magnitude equal to 15 amperes causes the same torque to be produced. Consequently, it would be decided to excite only phase A since its excitation alone produces the desired torque at less current than the excitation of the combination of phases A and B. Therefore, the motor operates at a higher efficiency with only phase A excited as compared to both phases A and B being excited. In accordance with the invention, a value of current corresponding to 10 amperes is stored in the torque look-up table memory associated with phase A and defined by the rotor position A and torque value at the line 100. The corresponding locations defined by rotor position A and the torque value in the memory devices associated with phases B and C have a zero value stored at the defined memory location.

Considering the rotor position B in FIG. 6, if the desired torque to be produced is represented by the line 100, it is seen that the desired torque may be produced by either supplying current for phase A alone or for phases A and B. The phase A current required is determined by interpolating the distance between the 15 ampere curve and the 20 ampere curve and storing that value in the torque memory look up table for phase A and a value of zero for phases B and C at the storage location defined by the intersection of the desired torque value and the rotor position B. However, if it is assumed for illustrative purposes that the desired torque is the value represented by the line 102 and the rotor is at position B, it is seen that the desired torque is not producible by the excitation of phase A alone. Further analyzation of FIG. 6 shows that at position B the excitation of phases A and B with a current value somewhat less than 15 amperes produces the desired torque. The required current is determined by interpolating between the 10 and 15 ampere curves of phases A and B to determine the value of current required to produce the desired torque and the interpolated current value is stored in the torque look-up tables for phases A and B at a location defined by the rotor position B and the torque value represented by the line 102. Therefore, the torque look-up tables associated with phases A and B contain a current value at a location defined by the position B and torque value at line 102. The corresponding memory location for phase C contains a current value equal to zero. The above procedure is followed at each of the number of rotor positions and at each of the number of torque increments or values to provide the corresponding current values to be stored in the memory devices.

Another important feature of the present invention is that the torque characteristic curves for each phase A, B, C and the combined phases A+B, B+C, C+A can be determined for each individual motor to compensate for any differences in motor construction. This feature permits the optimum selection of phase current magnitudes to improve efficiency and performance for a given motor.

Because the motor is controlled according to current values selected from a look up table in memory, the difficulties and limitations associated with previous commutation control devices are avoided.

In actual implementation, the data representative of and defining the torque curves for a motor for each of a number of current magnitudes is recorded in a memory associated with a computer used to determine the current values. The current values for each phase A, B, C and combination of phases A+B, B+C and C+A at each torque incremental value and rotor position is determined using a computer algorithm which performs substantially the process described above. The values determined by the algorithm are then inputted to the proper storage locations in the respective memory devices associated with each of the phases A, B and C in accordance with the torque value and rotor position to produce a torque look-up table for each of the phases.

A method and related apparatus for controlling torque and torque ripple produced by a variable reluctance motor has been described above in a preferred embodiment. It will be understood that numerous substitutions and modifications may be made without departing from the spirit and scope of the invention. It will also be understood that the particular arrangement and selection of the circuit components and memory devices and the manner of inputting the information representative of the torque, rotor position and phase current and retrieval of that information from the memory devices may vary considerably without departing from the invention. Therefore, the present invention has been disclosed by way of illustration rather than limitation.

We claim:

1. Apparatus for controlling torque and torque ripple in a variable reluctance motor having at least one phase and including a stator and a rotor arranged for movement about a common axis and relative to one another, said apparatus comprising:

means for sensing the angular position of the rotor relative to the stator;

means for providing a torque command signal representative of a desired torque to be developed by the motor;

means for generating a plurality of torque waveforms for each phase of the number of phases associated with the motor, said generated torque waveforms corresponding to the torque developed by the actual motor when excited by an electrical current having a predetermined, constant magnitude;

means utilizing said torque waveforms for providing a table of values representative of the magnitude of electrical current at each sensed angular position and corresponding to the actual torque developed by the motor when the motor is excited by an electrical current having that value, and means coupled to said table providing means and to the motor for receiving the value of electrical current defined by the sensed angular position and the torque command signal to supply to the motor an electrical current having a magnitude equal to said defined value to cause the motor to develop a torque substantially equal to the desired torque at each of said sensed angular positions, said developed torque having a substantially flat and ripple free response characteristic.

2. Apparatus for controlling torque as defined in claim 1 wherein each of said torque waveforms of said plurality of torque waveforms is generated for an associated one of a number of different magnitude electrical currents.

3. Apparatus for controlling torque as defined in claim 1 wherein said means for providing a table of values comprises a memory device, said memory device having a number of storage locations each of which are addressable by a unique identification address for accessing and retrieving information stored at the corresponding location, each of said storage locations being defined by the intersection of a given torque value and a given rotor position and containing a value of current representative of the magnitude of current to be supplied to the motor to produce said given torque at said given rotor position, each of said phases of the number of phases associated with the motor having its own separate storage location for each value of current defined by each intersection of a given number of different torque values at a given number of different rotor positions.

4. Apparatus for controlling torque as defined in claim 3 wherein said memory device is a programmable read-only-memory (PROM).

5. Apparatus for controlling torque as defined in claim 3 wherein said memory device is a Random Access Memory (RAM).

6. A method for controlling torque and torque ripple in a variable reluctance motor having at least one phase and including a stator and a rotor arranged for movement about a common axis and relative to one another, said method comprising the steps of:

sensing the angular position of the rotor relative to the stator;

supplying a torque command signal representative of a desired torque to be developed by the motor;

generating a plurality of torque waveforms for each phase of the number of phases associated with the motor, said generated torque waveforms corresponding to the actual torque developed by the motor when excited by an electrical current having a predetermined, constant magnitude;

producing from said generated torque waveforms a table of values representative of the magnitude of electrical current at each sensed angular position and corresponding to the actual torque developed by the motor when the motor is excited by an electrical current having that value;

storing each value contained in the table of values at an addressable storage location in a memory device, each of said storage locations being defined by the intersection of a given torque value and a given rotor position, said values being stored for each of said phases associated with the motor;

accessing and retrieving from each storage location associated with each phase a value of current stored at the location and corresponding to the desired torque at the given rotor position;

generating an electrical current having a magnitude equal to the value of electrical current accessed and retrieved from the storage location defined by the sensed angular position and the torque command signal, and supplying the generated electrical current to the motor to cause the motor to develop a torque substantially equal to the desired torque at each of said sensed angular positions so that the developed torque has a substantially flat and ripple free response characteristic.

* * * * *